Sept. 4, 1934.    J. A. HOEGGER, JR    1,972,562
THERMOSTATICALLY CONTROLLED MIXING VALVE
Filed March 12, 1931    2 Sheets-Sheet 2
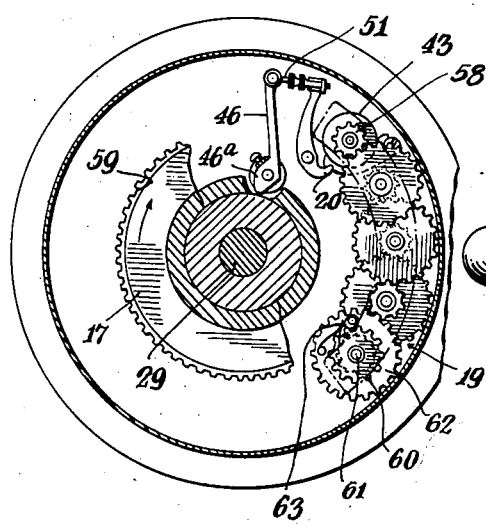
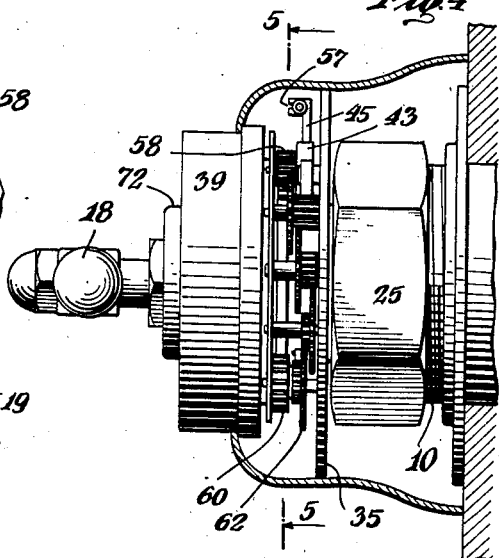
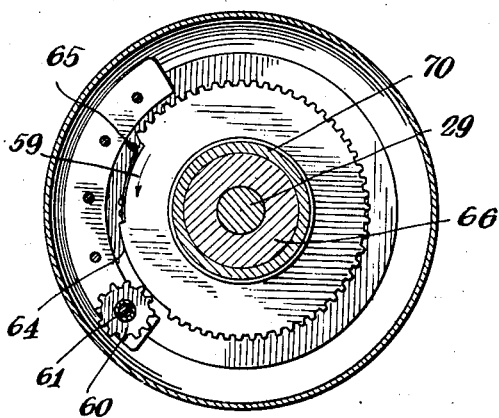
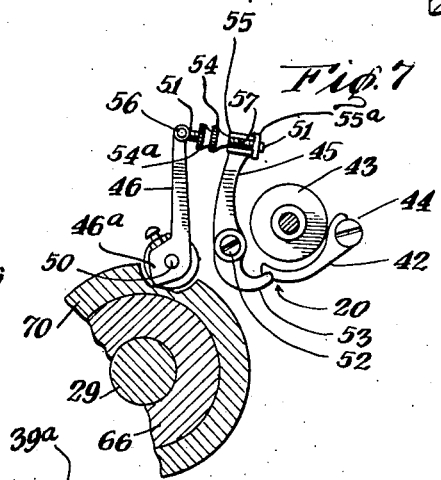
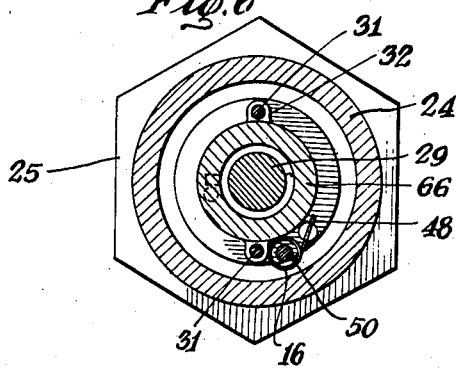
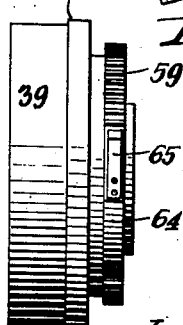
Inventor
Joseph A. Hoegger jr.
By his Attorneys Patented Sept. 4, 1934

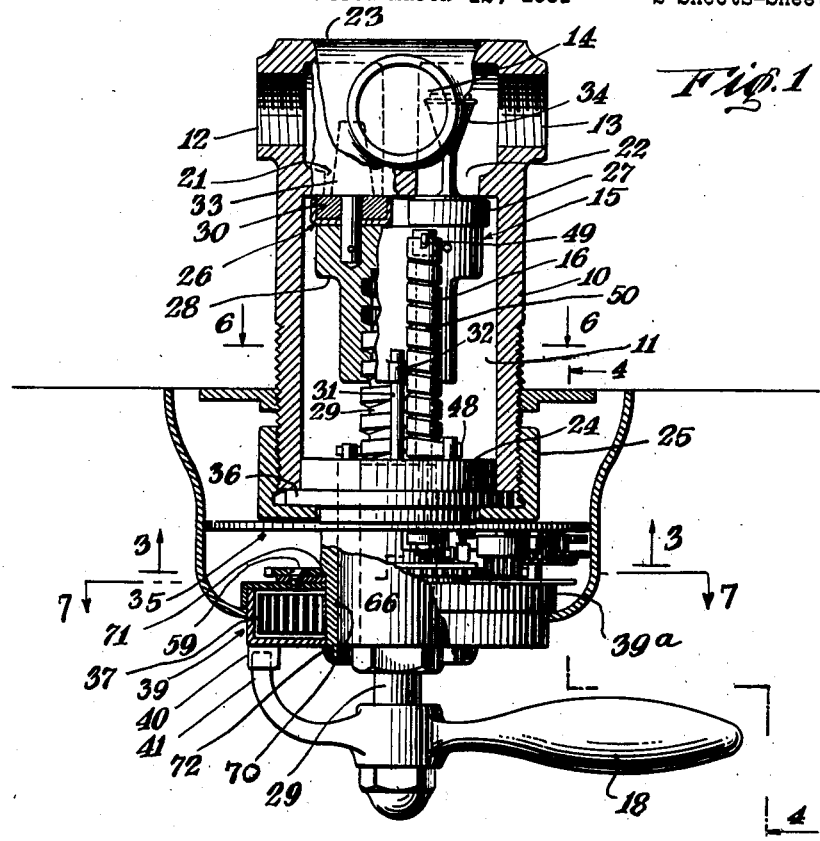

1,972,562

UNITED STATES PATENT OFFICE 1,972,562

THERMOSTATICALLY CONTROLLED MIXING VALVE

Joseph A. Hoegger, Jr., Weehawken, N. J., assignor to Joseph A. Hoegger, Jersey City, N. J.

Application March 12, 1931, Serial No. 521,950

15 Claims. (Cl. 137—139)

The present invention relates to mixing valves and more particularly to mixing valves designed to be automatically responsive to variations in temperature.

The invention has especial application to valves to be used in connection with regulating the mixing of hot and cold water to be dispensed in a shower bath so as to avoid discomfort to the bather. The invention, however, is not limited to this use, but may be applied to any situation where fluids, liquid or gaseous, of varying temperatures are to be combined to provide a mixture which will not exceed a given predetermined temperature.

It is an object of the invention to provide an improved thermostatically controlled mixing valve which will operate automatically upon the temperature of the mixture rising above a predetermined degree.

It is also an object of the invention to provide mechanism automatically operable under a control permitting operation thereof responsive to the temperature of a mixture above a predetermined degree and which will arrest operation when a mixture of predetermined, desired lower temperature is attained.

In valves of this character, it is desirable that the mechanism and construction thereof should be simple and inexpensive as well as positive and dependable in operation and that it should be comprised of the fewest number of operative parts possible.

It is further desirable, in apparatus of this character, that the thermostatic control should be sensitively responsive to temperature changes in order that the valve action may take place promptly upon the mixture reaching a certain temperature.

It is, therefore, a further object of the invention to provide an improved mixing valve having the above desirable characteristics.

In accordance with the invention, the above objects are accomplished by providing means for the regulation of the relative quantities of hot and cold fluid delivered to a common chamber by valve means adapted to be operated by suitable mechanism under thermostatic control of the mixture. Preferably, the said control is further adapted to operate to arrest the operation of the valve when a predetermined lower temperature is reached in the mixture.

More specifically, in accordance with the invention, there may be provided a valve casing having a mixing chamber in communication through suitable ports with hot and cold fluid conduits and valve means serving to regulate the proportional flow of fluids into the mixing chamber from the several conduits, said valve means adapted to be operated either manually or under influence of power means adapted to be set for operation subject to release thereof by holding means operating automatically under influence of a predetermined rise of temperature in the mixture.

A convenient form of power means for the present purposes is a coiled spring connected between a stationary part of the valve casing and a casing or drum rotatable relatively to the valve casing. In accordance with the invention, a common means may be provided adapted by its relation with the drum for winding the spring for setting the same, and also adapted to serving as an instrumentality for manual operation of the valves independently of its spring setting movements.

Likewise, in accordance with the invention, suitable power reducing means may be connected between the spring winding drum and the holding means referred to above, and the holding means may be in the nature of a brake shoe adapted to act on a brake drum, the brake shoe being connected with a thermostat for operation thereby.

A specific embodiment illustrative of the invention is disclosed in the accompanying drawings, in which:

Figure 1 is a sectional view of a valve construction in accordance with the present invention taken axially of the valve casing.

Figure 2 is a front elevational view of the valve construction, a portion being broken away to show the power spring and its connection to the enclosing casing.

Figure 3 is a sectional view on line 3—3 of Figure 1 showing the thermostatically controlled brake mechanism and the power reducing mechanism between the spring casing and the brake mechanism.

Figure 4 is a sectional view on line 4—4 of Figure 1.

Figure 5 is a sectional view on line 5—5 of Figure 4.

Figure 6 is a sectional view on line 6—6 of Figure 1.

Figure 7 is a fragmentary section on line 7—7 of Figure 1.

Figure 8 is a detail of the mutilated gear on the spring casing.

The embodiment of the invention, as illustrated in the drawings, comprises: a valve casing 10 having a mixing chamber 11 communicating with inlet conduits 12 and 13, the former for hot and the latter for cold fluid, and with an outlet conduit 14, communication between the inlet conduits and the chamber being under control of valve mechanism generally designated by the number 15 which is, in turn, operated by suitable actuating power mechanism 17 under automatic control of a thermostat 16 responsive to the changes of temperature in the mixing chamber 11. The control of the valve mechanism is preferably such that actuation of the same may be effected either automatically through the power mechanism 17, or manually by a handle 18, and in order that the thermostat 16 may be delicately responsive to changes of temperature in the chamber 11 the thermostat is, preferably, made such that it is capable of acting with considerable force, through power reducing mechanism 19 and brake mechanism 20 on the power mechanism 17.

The various mechanisms outlined are characterized as follows:

The valve casing 10 is in the nature of a cylinder in which is located the chamber 11 and the inlet conduits 12, 13 and outlet conduit 14; communication between the inlet ports and the chamber 11 being through ports 21 and 22 under control of the valve mechanism 15. The conduits 12, 13 and 14 are preferably located at one end of the casing which is otherwise closed by an end wall 23, the opposite end being threaded to receive thereupon a base member 24, which serves to close that end and to which is attached the valve mechanism, actuating mechanism and control mechanism. A threaded member 25 encircles the supporting structure 24 and screws on to the threaded end of the casing 10. This union like member bears against the flange 36 of the member 24 and causes it to bear against the edge of the casing 10, thus firmly securing the member 24 in place and sealing the end of the casing.

The supporting member 24 comprises an extended cylindrical section 66, in which the shaft 29 is journaled. Suitable packing material is also maintained around the shaft within this portion of the member 24. The spring casing or drum 39 is received upon the sleeve portion 70 of the member 35 and, when assembled therewith, rests on a shoulder 71 of the sleeve portion and is held in place by a nut 72.

The valve mechanism comprises two valves 26 and 27, adapted to move axially of the casing 10 within chamber 11 under influence of the threaded connection between the head 28 on which the valves are mounted and the stem 29 carried by the supporting structure 24 and projecting outwardly therebeyond, the projecting end being connected with the handle 18 so as to be rotatable thereby. The valves 26 and 27 may be cupped as shown for the reception of suitable washers 30 which are preferably of resiliently yieldable material. These valves are positioned relative to each other so as to simultaneously open or close the ports 21 and 22 under influence of turning movements of the stem 29 and serve to simultaneously open or close the valves. Suitable guide members for the head 28 are provided in the nature of rods 31 projecting from the supporting structure 24 slidably extended through ears 32 on the said head.

Extending from the valves 26 and 27 are the control members 33 and 34, movable with the valves coaxially respectively of the ports 21 and 22. These regulating or control members serve, when the valves are open, to regulate the relative quantities of fluid flowing through the two ports. The regulating members are, as shown, of conical configuration and are positioned with their bases facing in opposite directions, so that as the valves move towards and away from their seats the flow of fluid through the ports will be inversely varied, i. e. as the flow from one conduit is increased the flow from the other will be decreased.

The power mechanism 17 may conveniently be in the nature of a spirally wound spring 37, connected between the stationary flanged supporting structure 35 attached to the member 24 and the circumferential wall 38 of an enclosing casing or drum 39; the latter being rotatable relative to the supporting structure 35 for placing the spring under tension. The casing 39 is made in two sections so that the spring 17 may be enclosed. These sections may be screwed or bolted together. The inner section 39a carries the mutilated gear 59 described later. The outer sections carry the lug 40. The drum 39 may be conveniently rotated for placing the spring under tension by provision of a lug 40 on the casing in the path of rotation of the curved over end of an arm 41 integrally formed with the handle 18. By this arrangement, it will be noted that rotation of the handle may serve simultaneously in the winding of the spring and operation of the valve mechanism while also having movement for actuation of the valve mechanism independently of power setting. It is possible, therefore, for an operator to first turn the handle 18 for placing the spring under tension and then to subsequently operate the handle between limits for regulating the relative flow of fluids from the several supply conduits into the mixing chamber.

The spring 37 within the casing 39 operates through its connection as shown at 38a to turn the casing. The rotational movement may be transferred by the mutilated gear 59 attached to the inner portion 39a of the casing to the gear 60. The gear 60 is the first element of a power reducing gear train generally designated by the reference character 19. By means of a brake operating upon the last member of this power reducing gear train the rotational movement of the spring operated drum 39 is controlled.

The gear 60 operates upon the shaft 61. Also operating upon this shaft is a gear 62 which meshes with the next element in the gear train. The gear 60 is free to rotate on the shaft 61 and the two gears 60 and 61 are connected for rotation together in one direction by a dog and ratchet connection 63, the latter of which is connected to the gear 60 and the former to the gear 62. In the opposite direction, of course, the gear 60 may rotate independently of the gear 62. That is, in tensioning the spring 37 in which operation the mutilated gear 59 is rotated, the gear 60 rotates independently of the gear 62 and thus does not cause the operation of the gear train, but in the escape of the tension of the spring 37, the rotation of the drum 39 and the mutilated gear 59 is communicated through the gear 60 and the gear 62 to the remaining elements of the power reducing gear mechanism 19. The last element of the power reducing gear train consists of the brake drum 43. It is seen that by preventing movement of this brake drum 43 which movement may be prevented by a relatively small application of pressure due to the power reducing gear train, that the entire movement of the drum 39 may be prevented. The drum 39 as already stated, carries the lug 40 which can bear against the arm 41 of the valve lever. If movement of the drum 39 through the lug 40 and the arm 41 causes the valve manual control handle to turn in a counter clockwise direction, the valves 20 and 21 may be closed, or at least, the proportions of fluid passing through the orifices 21 and 20 will be varied.

The brake 42 pivoted at 44 is adapted to operate upon the brake drum 43. Movement of this brake 42 against the brake drum is caused by the expansion of the thermostatic coil 16 which is placed in the fluid mixing chamber and which is sensitive to temperature changes of the fluid therein. This thermostatic coil consists of helically wound band of material which is fixed at one end 48 to the supporting member 24. The other end is connected at 49 to a rod 50 which is positioned within the coil and extends through the supporting member 24. Suitable packing may be used to prevent leakage around the rod 50 at the point at which it passes through the supporting member 24. This rod is free to rotate upon expansion or contraction of the helical thermostat which expansion or contraction is transmitted as a rotational movement to the rod at the point 49. This rotational movement is transmitted to an arm 46 attached at the point 46a to the rod 50. The arm 46 has pivotally connected at its end 56 a link 51 which is threaded. Threaded on this link there is a sleeve nut 54 which has the shoulders 55 and 55a. There is also a lock nut 54a adapted to hold the sleeve 54 in position when it is properly adjusted. A lever 45 pivoted at the point 52 bears at one end 53 against the brake 42 and at the other end is fitted with a head 57 in which there is a crotch. This crotched head receives the sleeve nut 54 and lies between the shoulders 55 and 55a thereon. The sleeve 54 and the lock nut 54a may be adjusted along the link 51 so as to cause a proper action of the brake 42 responsive to a definite reaction of the thermostat 16. The position of the arm 46 upon the rod 50 may also be adjusted.

The brake 42 will normally bear against the brake drum 43, thus preventing rotation of the drum 39 which is in a potentially operative position provided, of course, it has been placed in such a position by a movement of the lever 18 and the arm 41 against the lug 40 in opening the mixing valve. The thermostat is sensitive to temperature changes and upon a predetermined maximum temperature being reached in the mixing chamber, the expansion will be such that this thermostat will uncoil sufficiently to rotate the rod 50 to an extent which will move the arm 46 and through the link connection 51 the arm 45, so that the brake 42 will move away from the brake drum. This permits the gear train to operate. The brake drum 39 will, therefore, turn in a counter clockwise direction and unless the valve has already been closed manually, the lug 40 will bear against the lever 41 and force it towards a closed position. This movement will continue until the temperature drops in the mixing chamber such that the thermostat will contract and through the rod 50 and levers 46 and 45 force the brake 42 against the brake drum, thus stopping further movement of the drum 39.

The gear 59 as stated above is mutilated providing a section 64 free from teeth such that, when this section is reached, closing action of the valves 26 and 27 will be quite rapid and unrestrained by any retarding effect upon the power reducing mechanism 19.

The operation of the valve mechanism described above is as follows: Presuming the valve to be included in a shower bath system, the operator turns the handle 18 in a direction to place the spring 37 under tension. This would normally be in a clockwise direction as the valves would be opened by such movement. The end of arm 41 bears against the lug 40; the relative movement between gear 60 and 62 permitting rotation of gears 59 and 60 incident to winding of the spring while the brake shoe 42 holds the rest of the train of gears of the power reducing mechanism stationary.

After the spring 37 has been set, it will be held under tension by the brake mechanism 20 until, under thermic influence within mixing chamber 11, the brake drum 43 is released by the brake shoe 42. When the temperature within chamber 11 is raised to the predetermined degree for which the thermostatic mechanism is set, this release will occur and the brake shoe 42 will be rotated away from the drum by the rotation of the rod or shaft 50 which rotation is brought about by the uncoiling due to the heat reaction of the thermostat 16. The force of spring 37 for closing valves 26 and 27 is communicated to the latter through the rotation of casing 39, with lug 40 contacting with the end of arm 41 by means of which shaft 29 is rotated and head 15 is moved axially of chamber 11 through the screw action of the connection between the head and shaft 29. When a lower temperature is reached due to the change of the proportions of hot and cold fluid permitted to enter the mixing chamber by the movement of the valves, the brake shoe 42 will again become effective if the temperature drops below the maximum set temperature due to the reverse rotation of the rod 50, and the closing movement of the valves halted. The valves will remain at this adjustment until the temperature in the chamber 11 again reaches the predetermined temperature for releasing the brake with a repetition of the above action or a complete closing of the valves 26 and 27 as the case may be.

Closing of the valves will be retarded during the first part of the escapement so that the force required to stop the same will be kept within that which the brake shoe 42 under influence of the thermostat 16 is capable of exerting. However, if the fluid within chamber 11 has not reached the temperature at which the thermostat will cause a braking action until the mutilated section 64 of the gear 59 is reached, the valves 26 and 27 then will be closed suddenly and positively under influence of spring 37.

The mutilated portion of gear 59 is provided with a yielding tooth 65 serving to assist engagement of the gear 60 with the teeth of gear 59. It will be noted that the fluid flow regulating member 33 is directed so as to gradually diminish the flow of hot fluid into the mixing chamber and the member 34 so as to gradually increase the flow of cold fluid thereinto as the valves 26 and 27 move simultaneously toward their seats.

Advantages of the present invention are that in an improved organization, positiveness of action together with delicate sensitiveness to changes of temperature within the fluid mixture is made possible by providing a comparatively strong power member together with a light thermostatic element connected by power reducing mechanism including a brake unit. The advantage of compactness is realized among other things by so organizing the mechanism that the handle 18 may serve to place the spring 37 under tension and to permit subsequent adjustment of the valves 26 and 27 independently of the spring winding action.

In applying my valve to a particular use such as for example, a shower bath valve, it is seen that the thermostat can be set or adjusted so that it will prevent the temperature of the stream of water emitted from rising above one which would cause extreme discomforture to the user. Should the temperature of the water in the mixing chamber rise above such a predetermined temperature, the thermostat will permit the power mechanism to operate which will turn the valve in such a direction that the proportion of cold water will be increased and hot water decreased, thus lowering the temperature of the fluid mixture. If the supply of cold water to the mixing valve should entirely stop, the temperature to which the thermostat is subjected may continue over a sufficient period to permit the power mechanism to entirely close the valve shutting off the water completely. When the valve is shut off a certain amount approaching a point of complete closure by the power mechanism, the valve will suddenly completely close due to the removal of the retarding influence of the gear train and because of the mutilated section of the gear 59. It has already been pointed out that the valve may be manually adjusted to any degree of closure or to produce a desired mixture of hot and cold fluid after the power mechanism has been made potentially operative.

Numerous other advantages will appear from an understanding of the principles of the invention and it is to be understood that the principles of the invention may be presented in variations from the form herein illustrated. This type of control mechanism may be used with other valve constructions than the one illustrated and is adaptable for use with both liquid and gases. It is desired, therefore, that the scope of the invention should not be limited except by the broad interpretation of the appended claims and the state of the art as heretofore developed.

1. In a device of the kind described, a mixing valve adapted by its movement to change the relative quantities of hot and cold fluid in a mixture, a thermostat responsive to the temperature of the mixture and a motor operating mechanism controlled by the thermostat and adapted to actuate the valve when a predetermined temperature of the mixture is reached to decrease the amount of hot fluid in the mixture.

2. In a device of the kind described, a mixing valve adapted by its movement to change the relative quantities of hot and cold fluid in a mixture, a thermostat responsive to the temperature of the mixture and a motor mechanism positioned apart from the mixture and controlled by the thermostat and adapted to actuate the valve when a predetermined temperature of the mixture is reached to decrease the amount of hot fluid in the mixture and to arrest the valve upon reaching a predetermined temperature of the mixture.

3. In a device of the kind described, a mixing valve comprising a casing having therein a mixing chamber, hot and cold fluid conduits communicating with the chamber and valve means controlling the flow of fluid from said conduits to the mixing chamber, motor mechanism for operating the valve means, a thermostat positioned to be influenced by the temperature of said mixing chamber, and adapted under influence of a predetermined temperature to permit actuation of the valve means by said motor mechanism for varying the flow of fluid from the conduits to the mixing chamber.

4. In a device of the kind described, a mixing valve comprising a casing having therein a mixing chamber, hot and cold fluid conduits communicating with the chamber and valve means controlling the flow of fluid from said conduits to the mixing chamber, motor mechanism for the valve means, a thermostat controlling said motor mechanism positioned to be influenced by the temperature of said mixing chamber, and adapted under influence of a predetermined temperature to permit actuation of the valve means through said motor mechanism for varying the flow of fluid from the conduits to the mixing chamber, said motor mechanism including means for stopping the operation of the mechanism when a predetermined lower temperature is reached.

5. In a device of the kind described, a mixing valve adapted by its movement to change the relative quantities of hot and cold fluid in a mixture, said valve including a casing having a mixing chamber and hot and cold fluid conduits leading thereto and ports connecting said chamber and conduits, valves operable simultaneously in the same direction for opening and closing said ports, means for operating said valves, regulating means in each conduit operable simultaneously under influence of the opening and closing movements of the valves and acting oppositely to each other for controlling the flow of fluid through the respective ports, and mechanism for actuating said valves, braking means for holding the mechanism inoperative and thermostatic means controlling said braking means.

6. In a device of the kind described, a mixing valve adapted by its movement to change the relative quantities of hot and cold fluid in a mixture, said valve including a casing having a mixing chamber and hot and cold fluid conduits communicating therewith through ports, control means in each port for regulating the flow of fluid therethrough, automatically operable mechanism adapted to be set for actuating said control means, means operable for manually actuating said control means for setting said mechanism, and means adapted to hold said mechanism in set condition and thermostatic means operable for releasing the same.

7. In a device of the kind described, a mixing valve having a mixing chamber and hot and cold fluid conduits communicating therewith through ports, valves for opening and closing the ports simultaneously, control means for simultaneously varying the quantity of fluid flowing through said ports so that the variation in one port takes place inversely to that in the other, and power means for operating both said control means and valves a braking mechanism connected to said power means and thermostatic means for controlling said braking mechanism.

8. In a device of the kind described, a mixing valve casing having a mixing chamber, hot and cold fluid conduits communicating therewith through ports, valves for controlling said ports, and mechanism adapted to be set for operating said valves automatically, means movable for setting said mechanism and also movable for operating the valves independently of the setting of the mechanism.

9. A casing having a mixing chamber therein, valve mechanism controlling the flow of hot and cold fluid to said chamber, a normally inactive power element to close the valve mechanism, a thermostat responsive to the temperature of the chamber acting to set the power element in operation and a handle for setting the power element, and also independently functioning for the manual operation of the valve mechanism.

10. A casing having a mixing chamber therein, valve mechanism controlling the flow of hot and cold fluid to said chamber, a normally inactive spring motor to close the valve mechanism, a thermostat responsive to the temperature of the chamber acting to set the spring motor in operation and a handle for winding up the spring motor, and also independently functioning for the manual operation of the valve mechanism.

11. In a device of the character described, a chamber, a valve controlling flow of fluid therethrough, motor means adapted to be set for operation of the valve, means operable for manually setting the motor means and also operable independently of setting the motor means for operating the valve in manually controlling the flow of fluid through the conduit.

12. In a device of the character described, a chamber, a valve controlling flow of fluid therethrough, power means adapted to be set for operation of the valve, means operable for manually setting the power means and also operable independently of setting the power means for operating the valve in manually controlling the flow of fluid through the conduit, and thermostatic means connected to said power means and positioned to be influenced by the temperature in the chamber for controlling the operation of said power means in controlling said valve.

13. In a device of the kind described, a mixing valve casing having a mixing chamber with hot and cold fluid conduits communicating therewith through ports, valves for opening and closing said ports and means operable with said valves for inversely varying the quantity of fluid flowing through the ports with respect to each other when the valves are open, mechanism adapted to be set for automatically moving the valves toward closed position when released, means under thermostatic control from the mixing chamber for holding the mechanism in set condition and for releasing the same when thermal conditions within the casing reach a predetermined temperature, means operable for setting the mechanism and further operable after the mechanism is set for operating the valves independently of operation of the said mechanism.

14. In a device of the kind described, a mixing valve comprising a casing having a mixing chamber and conduits communicating therewith through ports, valve means controlling said ports, power means adapted to be set for automatically operating the valve means when released, holding means including power reducing mechanism for holding the power means, and a thermostatic control for the holding means adapted to release the power means when the control is subjected to a predetermined temperature.

15. In a device of the character described, a chamber, a valve controlling flow of fluid therethrough, motor means adapted to be set for operation of said valve, manual control means for setting the motor means and for operating the valve, said control means being operable for manually setting the motor means prior to valve operation and also operable subsequently and independently of setting the motor means for operating the valve in manually controlling the flow of fluid through the conduit.

JOSEPH A. HOEGGER, Jr.